(12) United States Patent
Takeuchi et al.

(10) Patent No.: US 8,350,516 B2
(45) Date of Patent: Jan. 8, 2013

(54) ELECTRIC MOTOR DRIVE DEVICE AND METHOD OF CONTROLLING THE SAME

(75) Inventors: Shigeto Takeuchi, Toyota (JP); Tomotsugu Taira, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 325 days.

(21) Appl. No.: 12/864,471

(22) PCT Filed: Mar. 6, 2009

(86) PCT No.: PCT/JP2009/054268
§ 371 (c)(1),
(2), (4) Date: Jul. 23, 2010

(87) PCT Pub. No.: WO2009/113452
PCT Pub. Date: Sep. 17, 2009

(65) Prior Publication Data
US 2010/0295494 A1 Nov. 25, 2010

(30) Foreign Application Priority Data
Mar. 10, 2008 (JP) ................................. 2008-060071

(51) Int. Cl.
H02P 27/06 (2006.01)
H02M 7/5387 (2007.01)
G01R 31/34 (2006.01)

(52) U.S. Cl. ............ 318/800; 318/805; 361/23; 361/43; 702/58; 702/64; 324/557

(58) Field of Classification Search ................... 318/504, 318/800–806; 363/95; 361/23, 30, 31, 33, 361/42, 43; 123/644; 702/57–65, 183; 324/525, 324/509, 537, 545, 546, 541, 551, 557, 772; 327/380, 381, 387
See application file for complete search history.

(56) References Cited

U.S. PATENT DOCUMENTS

| | | | | |
|---|---|---|---|---|
| 6,035,265 A | * | 3/2000 | Dister et al. | 702/183 |
| 6,196,208 B1 | * | 3/2001 | Masters | 123/597 |

(Continued)

FOREIGN PATENT DOCUMENTS

DE 10356468 A1 10/2004

(Continued)

OTHER PUBLICATIONS

International Search Report PCT/JP2009/054268, Jun. 2, 2009 English Translation.

Primary Examiner — Eduardo Colon Santana
(74) Attorney, Agent, or Firm — Sughrue Mion, PLLC

(57) ABSTRACT

A control device controls a switching operation of a switching element such that an AC voltage allowing an AC motor to output torque in accordance with a torque command value is applied to a coil winding of each phase. The control device sets a gate resistance variably between a first pulse voltage at the time of reversal of polarity of the AC voltage and a remaining pulse voltage, in a drive circuit for turning on/off the switching element in response to a switching control signal. By making longer a time period for the first pulse voltage at the time of reversal of polarity to rise, occurrence of partial discharge in a gap between coil windings of respective phases is suppressed.

16 Claims, 11 Drawing Sheets

U.S. PATENT DOCUMENTS

| | | | |
|---|---|---|---|
| 6,271,709 B1 * | 8/2001 | Kimura et al. | 327/380 |
| 6,474,321 B1 * | 11/2002 | Suckewer et al. | 123/620 |
| 7,256,701 B2 * | 8/2007 | Kono et al. | 340/648 |
| 7,639,021 B2 * | 12/2009 | Li et al. | 324/525 |
| 7,828,094 B2 * | 11/2010 | Ochiai et al. | 180/65.28 |
| 8,050,064 B2 * | 11/2011 | Kuno et al. | 363/56.05 |
| 2002/0017284 A1 * | 2/2002 | Masters | 123/597 |
| 2004/0196678 A1 | 10/2004 | Yoshimura et al. | |
| 2008/0197855 A1 * | 8/2008 | Uchida | 324/509 |
| 2009/0198439 A1 * | 8/2009 | Ochiai et al. | 701/112 |
| 2009/0279337 A1 | 11/2009 | Hamatani | |
| 2010/0008113 A1 * | 1/2010 | Kuno et al. | 363/95 |

FOREIGN PATENT DOCUMENTS

| | | | |
|---|---|---|---|
| JP | 10-127064 A | | 5/1998 |
| JP | 2000262087 A | * | 9/2000 |
| JP | 2007-240160 A | | 9/2007 |
| JP | 2007-295749 A | | 11/2007 |
| JP | 2008-022624 A | | 1/2008 |
| JP | 2008-301685 A | | 12/2008 |

* cited by examiner

ELECTRIC MOTOR DRIVE DEVICE AND METHOD OF CONTROLLING THE SAME

TECHNICAL FIELD

The present invention relates to an electric motor drive device and a method of controlling the same, and more particularly to a technique for preventing inter-phase dielectric breakdown in an electric motor drive device configured to drive an electric motor with an inverter.

BACKGROUND ART

For example, Japanese Patent Laying-Open No. 10-127064 (Patent Document 1) discloses an electric power conversion device for converting a direct-current power supply voltage to an alternating-current phase voltage having three voltage levels of positive (high potential), intermediate (zero potential) and negative (low potential), as an electric power conversion device for driving and controlling an electric motor (a motor) for driving a vehicle.

According to the disclosure, the electric power conversion device has, as PWM control, a dipolar modulation mode for alternately outputting positive and negative pulses over one cycle of an output voltage and a unipolar modulation mode for outputting pulses identical in polarity in a half cycle of an output voltage, and it includes means for selectively using the dipolar modulation mode in accordance with a power running operation mode or a regenerative operation mode. According to the disclosure, the dipolar modulation mode is selectively made unavailable for use in accordance with an operation mode of the device, so as to reduce switching loss on average. Patent Document 1 thus suppresses heat generation from a switching element and achieves smaller size and lighter weight of the device as a whole as well as higher efficiency of the device.

Patent Document 1: Japanese Patent Laying-Open No. 10-127064

DISCLOSURE OF THE INVENTION

Problems to be Solved by the Invention

The electric power conversion device described in Patent Document 1 above, however, suffers a problem that partial discharge is likely in a space (a gap) between coil windings of the electric motor during execution of the unipolar modulation mode.

Namely, the coil winding of the electric motor suffers a problem of insulation between phases in addition to insulation to the earth between the winding and a core. In particular, originating from occurrence of partial discharge in a gap between coil windings, deterioration of an insulating material proceeds, which may finally result in short-circuiting of insulation between phases and failure of equipment.

How likely partial discharge is to occur is different, depending on an environment where an electric motor operates. In particular, in an example where the polarity of an AC voltage applied to a coil winding is reversed as in the unipolar modulation mode, surface charges induced at a surface of the coil winding (strictly speaking, at a surface of an insulating film) strengthen electric field generated in a space (gap) portion between the coil windings and partial discharge is likely to occur in the gap. Patent Document 1 above, however, is silent about electric motor drive control for preventing partial discharge, which may result in inter-phase dielectric breakdown.

Therefore, the present invention was made to solve such problems, and an object of the present invention is to provide an electric motor drive device configured to drive an electric motor with an inverter, capable of controlling the inverter so as to prevent occurrence of partial discharge which results in inter-phase dielectric breakdown between coil windings, as well as a method of controlling the same.

Means for Solving the Problems

According to the present invention, an electric motor drive device includes an electric power conversion device for generating an AC voltage through a switching operation of a power semiconductor device, an electric motor having a coil winding to which the AC voltage from the electric power conversion device is applied, and a control device for controlling the switching operation of the electric power conversion device. The control device controls the switching operation of the electric power conversion device such that a voltage variation rate at the time of reversal of polarity of the AC voltage is relatively low, when the AC voltage exceeds a prescribed value.

Preferably, the electric power conversion device includes an inverter for generating, as the AC voltage, a bipolar pulse of voltage having a prescribed voltage amplitude and a prescribed pulse width through the switching operation of the power semiconductor device. The control device controls a switching operation of the inverter such that a time period for the bipolar pulse of voltage to rise at the time of reversal of polarity thereof is relatively long, when the prescribed voltage amplitude exceeds the prescribed value.

Preferably, the inverter includes a path for transmitting a drive control signal to a control electrode of each power semiconductor device. The control device sets a delay impedance of the path to be relatively high at the time of reversal of polarity of the bipolar pulse, when the prescribed voltage amplitude exceeds the prescribed value.

Preferably, the electric power conversion device includes an inverter for generating, as the AC voltage, a bipolar pulse of voltage having a prescribed voltage amplitude and a prescribed pulse width through the switching operation of the power semiconductor device. The control device controls a switching operation of the inverter such that a time period for the bipolar pulse to rise is relatively long, when the prescribed voltage amplitude exceeds the prescribed value.

Preferably, the inverter includes a path for transmitting a drive control signal to a control electrode of each power semiconductor device. The control device sets a delay impedance of the path to be relatively high when the prescribed voltage amplitude exceeds the prescribed value.

Preferably, the electric power conversion device includes an inverter for generating, as the AC voltage, a bipolar pulse of voltage having a prescribed voltage amplitude and a prescribed pulse width through the switching operation of the power semiconductor device, and a DC power supply configured to be able to variably control an input voltage for the inverter through the switching operation of the power semiconductor device. The control device controls a switching operation of the DC power supply such that the input voltage at the time of reversal of polarity of the AC voltage is relatively low, when the AC voltage exceeds the prescribed value.

Preferably, the DC power supply includes a converter for converting a DC voltage from a power storage mechanism through the switching operation of the power semiconductor device, and a bypass switching element for forming a current path for bypassing the converter, between the power storage mechanism and the inverter. The control device turns on the bypass switching element at the time of reversal of polarity of the AC voltage when the AC voltage exceeds the prescribed value.

Preferably, the electric power conversion device further includes an inverter for generating, as the AC voltage, a bipolar pulse of voltage having a prescribed voltage amplitude and a prescribed pulse width through the switching operation of the power semiconductor device, and a pulse generator connected to the coil winding in parallel to the inverter and configured to be able to apply a pulse to the coil winding through the switching operation of the power semiconductor device. In a case where the AC voltage exceeds the prescribed value, the control device controls the pulse generator such that a pulse relatively smaller in voltage amplitude than the AC voltage is applied to the coil winding when the AC voltage is at zero potential at the time of reversal of polarity of the AC voltage.

According to another aspect of the present invention, a method of controlling an electric motor drive device including an electric power conversion device for generating an AC voltage through a switching operation of a power semiconductor device and an electric motor having a coil winding to which the AC voltage from the electric power conversion device is applied, includes the steps of obtaining the AC voltage, and controlling the switching operation of the electric power conversion device such that a voltage variation rate at the time of reversal of polarity of the AC voltage is relatively low, when the AC voltage exceeds a prescribed value.

Preferably, the electric power conversion device includes an inverter for generating, as the AC voltage, a bipolar pulse of voltage having a prescribed voltage amplitude and a prescribed pulse width through the switching operation of the power semiconductor device. In the step of controlling the switching operation of the electric power conversion device, when the prescribed voltage amplitude exceeds the prescribed value, a switching operation of the inverter is controlled such that a time period for the bipolar pulse of voltage to rise at the time of reversal of polarity thereof is relatively long.

Preferably, the inverter includes a path for transmitting a drive control signal to a control electrode of each power semiconductor device. In controlling the switching operation of the inverter, when the prescribed voltage amplitude exceeds the prescribed value, a delay impedance of the path is set to be relatively high at the time of reversal of polarity of the bipolar pulse.

Preferably, the electric power conversion device includes an inverter for generating, as the AC voltage, a bipolar pulse of voltage having a prescribed voltage amplitude and a prescribed pulse width through the switching operation of the power semiconductor device. In the step of controlling the switching operation of the electric power conversion device, in a case where the prescribed voltage amplitude exceeds the prescribed value, a switching operation of the inverter is controlled such that a time period for the bipolar pulse of voltage to rise is relatively long.

Preferably, the inverter includes a path for transmitting a drive control signal to a control electrode of each power semiconductor device. In controlling the switching operation of the inverter, when the prescribed voltage amplitude exceeds the prescribed value, a delay impedance of the path is set to be relatively high.

Preferably, the electric power conversion device includes an inverter for generating, as the AC voltage, a bipolar pulse of voltage having a prescribed voltage amplitude and a prescribed pulse width through the switching operation of the power semiconductor device, and a DC power supply configured to be able to variably control an input voltage for the inverter through the switching operation of the power semiconductor device. In the step of controlling the switching operation of the electric power conversion device, when the AC voltage exceeds the prescribed value, a switching operation of the DC power supply is controlled such that the input voltage at the time of reversal of polarity of the AC voltage is relatively low.

Preferably, the DC power supply includes a converter for converting a DC voltage from a power storage mechanism through the switching operation of the power semiconductor device, and a bypass switching element for forming a current path for bypassing the converter, between the power storage mechanism and the inverter. In controlling the switching operation of the DC power supply, when the AC voltage exceeds the prescribed value, the bypass switching element is turned on at the time of reversal of polarity of the AC voltage.

Preferably, the electric power conversion device further includes an inverter for generating, as the AC voltage, a bipolar pulse of voltage having a prescribed voltage amplitude and a prescribed pulse width through the switching operation of the power semiconductor device, and a pulse generator connected to the coil winding in parallel to the inverter and configured to be able to apply a pulse to the coil winding through the switching operation of the power semiconductor device. In the step of controlling a switching operation of the electric power conversion device, in a case where the AC voltage exceeds the prescribed value, the pulse generator is controlled such that a pulse relatively smaller in voltage amplitude than the AC voltage is applied to the coil winding when the AC voltage is at zero potential at the time of reversal of polarity of the AC voltage.

Effects of the Invention

According to the present invention, in the electric motor drive device configured to drive the electric motor with the inverter, the inverter can be controlled to prevent occurrence of partial discharge which results in inter-phase dielectric breakdown between the coil windings.

Figure 1:
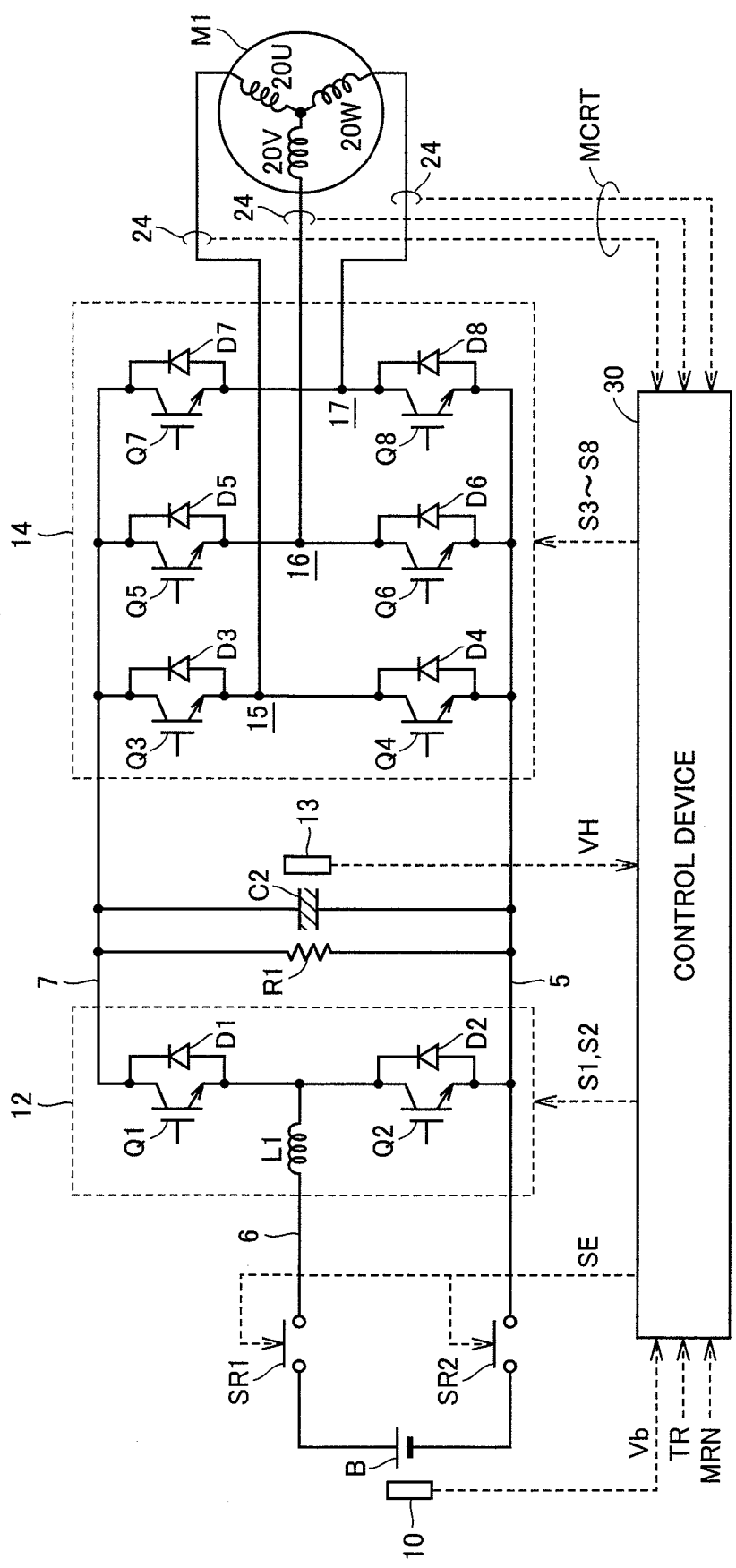
FIG. 1 is a schematic block diagram illustrating a configuration of an electric motor drive device according to a first embodiment of the present invention.

DESCRIPTION OF THE REFERENCE SIGNS 5 ground line; 6, 7 power supply line; 10, 13 voltage sensor; 12, 12A voltage step-up/step-down converter; 14, 31 inverter; 15 U-phase arm; 16 V-phase arm; 17 W-phase arm; 20U U-phase coil winding; 20V V-phase coil winding; 20W W-phase coil winding; 24 current sensor; 30, 30A, 30B control device; 40 motor-control phase voltage operation unit; 42 inverter PWM signal conversion unit; 50 inverter input voltage command operation unit; 52 converter duty ratio operation unit; 54, 54A converter PWM signal conversion unit; 100, 100A, 100B electric motor drive device; B power storage mechanism; BL current supply line; C2 smoothing capacitor; D1 to D8 anti-parallel diode; L1 reactor; M1 AC motor; Q1 to Q8, Q11, Q12, Qb switching element; R1 discharge resistor; RG1, RG2 resistor; and SR1, SR2 system relay.

BEST MODES FOR CARRYING OUT THE INVENTION

An embodiment of the present invention will be described hereinafter in detail with reference to the drawings. In the drawings, the same or corresponding elements have the same reference characters allotted.

First Embodiment

FIG. 1 is a schematic block diagram illustrating a configuration of an electric motor drive device 100 according to a first embodiment of the present invention.

Referring to FIG. 1, electric motor drive device 100 according to the first embodiment of the present invention includes a power storage mechanism B, voltage sensors 10 and 13, system relays SR1 and SR2, a voltage step-up/step-down converter 12, a discharge resistor R1, a smoothing capacitor C2, an inverter 14, a current sensor 24, an AC motor M1, and a control device 30.

For example, AC motor M1 is a drive motor for generating torque for driving driving wheels of a hybrid car or an electric car. Alternatively, the motor may be incorporated in a hybrid car such that it has a function as a generator driven by an engine and it operates as an electric motor for the engine, for example, in order to be able to start the engine.

Power storage mechanism B is configured to include such a secondary battery as a nickel metal hydride battery or a lithium-ion battery, and outputs a DC voltage between a power supply line 6 and a ground line 5. Voltage sensor 10 detects a DC voltage (a battery voltage) Vb output from power storage mechanism B and outputs detected DC voltage Vb to control device 30.

System relay SR1 is connected between a positive electrode terminal of power storage mechanism B and power supply line 6, while system relay SR2 is connected between a negative electrode terminal of power storage mechanism B and ground line 5. System relays SR1 and SR2 are turned on/off in response to a signal SE from control device 30.

For example, voltage step-up/step-down converter 12 is implemented by a voltage step-up/step-down chopper circuit, and it includes a reactor L1, power semiconductor switching elements (hereinafter also simply referred to as a switching element) Q1 and Q2, and diodes D1 and D2.

Switching elements Q1 and Q2 are connected in series between a power supply line 7 and ground line 5. Reactor L1 is connected between power supply line 6 and a connection node of switching elements Q1 and Q2. Anti-parallel diodes D1 and D2 are connected between emitters and collectors of switching elements Q1 and Q2, respectively, such that a current flows from the emitter side toward the collector side.

Turning on/off of switching elements Q1 and Q2 is controlled by switching control signals S1 and S2 from control device 30, respectively. For example, an IGBT (Insulated Gate Bipolar Transistor) is adopted as a switching element in the present embodiment.

Smoothing capacitor C2 is connected between power supply line 7 and ground line 5. In addition, discharge resistor R1 for discharging remaining charges in smoothing capacitor C2 in case electric motor drive device 100 stops or the like is connected in parallel to smoothing capacitor C2, between power supply line 7 and ground line 5.

Inverter 14 is constituted of a U-phase arm 15, a V-phase arm 16 and a W-phase arm 17, connected in parallel between power supply line 7 and ground line 5. The arm of each phase is constituted of switching elements connected in series between power supply line 7 and ground line 5. For example, U-phase arm 15 is constituted of switching elements Q3 and Q4, V-phase arm 16 is constituted of switching elements Q5 and Q6, and W-phase arm 17 is constituted of switching elements Q7 and Q8. In addition, anti-parallel diodes D3 to D8 are connected between collectors and emitters of switching elements Q3 to Q8, respectively.

Turning on/off of switching elements Q3 to Q8 is controlled by switching control signals S3 to S8 from control device 30, respectively. More specifically, each of switching elements Q3 to Q8 is turned on or off in response to an electrical input to a control electrode thereof. For example, the IGBT is turned on or off in accordance with a voltage at its gate (control electrode). Switching control signals S3 to S8 are input to the control electrodes (the gates) of switching elements Q3 to Q8, respectively, through a not-shown drive circuit.

Intermediate points of arms 15 to 17 of respective phases are electrically connected to one end sides of a U-phase coil winding 20U, a V-phase coil winding 20V and a W-phase coil winding 20W of AC motor M1, respectively. For example, AC motor M1 is a three-phase permanent magnet motor configured such that U-phase coil winding 20U, V-phase coil winding 20V and W-phase coil winding 20W are commonly connected to a neutral point. U-phase coil winding 20U, V-phase coil winding 20V and W-phase coil winding 20W correspond to the "coil winding" in the present invention. In addition, AC motor M1 corresponds to the "electric motor" in the present invention.

Current sensors 24 are provided in AC motor M1. Current sensors 24 detect motor currents MCRT (a U-phase current, a V-phase current and a W-phase current) of three phases and emit detected motor currents MCRT to control device 30. As the sum of instantaneous values of currents of three phases is zero, current sensors 24 should only be disposed to detect motor currents of two phases.

In a voltage step-up operation, voltage step-up/step-down converter 12 steps up a DC voltage supplied from power storage mechanism B and supplies the resultant voltage to inverter 14. More specifically, in response to switching control signals S1 and S2 from control device 30, an ON period of switching element Q1 and an ON period of Q2 are alternately provided and a step-up ratio complies with a ratio between these ON periods.

Alternatively, in a voltage step-down operation, voltage step-up/step-down converter 12 steps down a DC voltage supplied from inverter 14 through smoothing capacitor C2 and charges power storage mechanism B. More specifically, in response to switching control signals S1 and S2 from control device 30, a period during which only switching element Q1 turns on and a period during which both of switching elements Q1 and Q2 turn off are alternately provided and a voltage step-down ratio complies with a duty ratio of the ON periods above.

Smoothing capacitor C2 smoothes a DC voltage from step-up/step-down inverter 12 and supplies the smoothed DC voltage to inverter 14. Voltage sensor 13 detects a voltage VH across smoothing capacitor C2, that is, an output voltage of voltage step-up/step-down converter 12 (corresponding to an input voltage for inverter 14; to be understood similarly hereinafter), and outputs detected voltage VH to control device 30.

When inverter 14 is supplied with a DC voltage from smoothing capacitor C2, inverter 14 converts the DC voltage to an AC voltage through the switching operations of switching elements Q3 to Q8 in response to respective switching control signals S3 to S8 from control device 30 and drives AC motor M1.

During regenerative braking of a hybrid car or an electric car on which electric motor drive device 100 is mounted, inverter 14 converts an AC voltage generated by AC motor M1 to a DC voltage through the switching operation in response to switching control signals S3 to S8 and supplies the resultant DC voltage to voltage step-up/step-down converter 12 through smoothing capacitor C2.

It is noted that regenerative braking herein includes braking accompanying regeneration when a driver driving a hybrid car or an electric car operates a foot brake, and deceleration (or stop of acceleration) while carrying out regeneration, in which an accelerator pedal is turned off during running although a foot brake is not operated.

Control device 30 receives a torque command value TR and a motor speed MRN from an externally provided ECU (Electrical Control Unit), receives DC voltage Vb from voltage sensor 10, receives voltage VH from voltage sensor 13, and receives motor currents MCRT from current sensors 24. Control device 30 controls, based on these input signals, operations of voltage step-up/step-down converter 12 and inverter 14 such that AC motor M1 outputs torque in accordance with torque command value TR with a method which will be described later. Namely, switching control signals S1 to S8 for controlling voltage step-up/step-down converter 12 and inverter 14 in the above-described manner are generated and output to voltage step-up/step-down converter 12 and inverter 14.

Here, control device 30 controls the switching operations of switching elements Q3 to Q8 such that an AC voltage allowing AC motor M1 to output torque in accordance with torque command value TR is applied to coil windings 20U, 20V and 20W of respective phases. Namely, control device 30 generates switching control signals S3 to S8 in correspondence with such switching operations. An AC voltage applied to coil windings 20U, 20V, 20W of respective phases is hereinafter also referred to as a "motor drive voltage."

It is noted that switching control signals S3 to S8 generated by control device 30 are provided to a not-shown drive circuit. The drive circuit generates gate voltages for turning on or off switching elements Q3 to Q8, in response to switching control signals S3 to S8, respectively.

Figure 2:
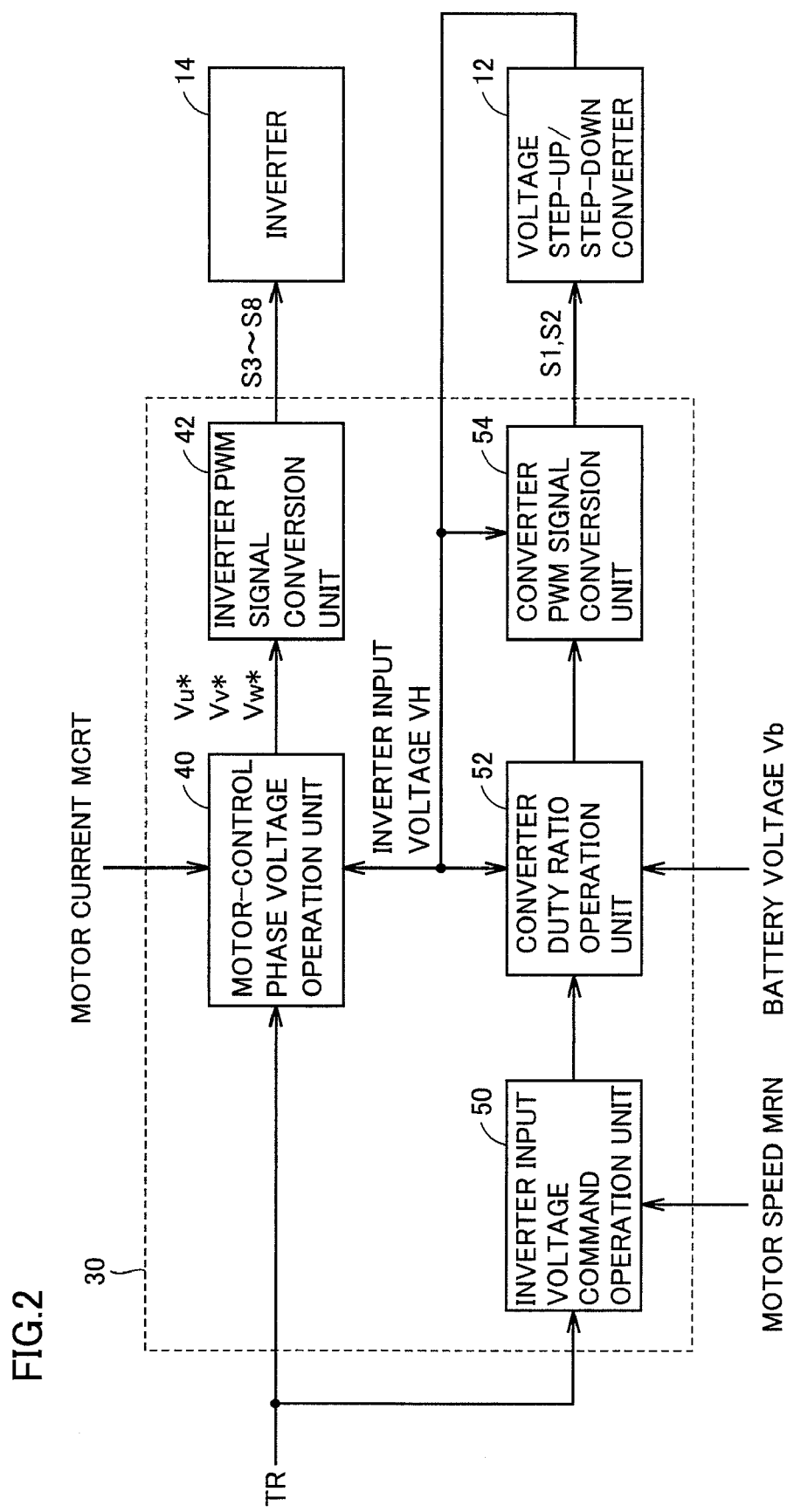
FIG. 2 is a block diagram of a control device in FIG. 1.

FIG. 2 is a block diagram of control device 30 in FIG. 1.

Referring to FIG. 2, control device 30 includes a motor-control phase voltage operation unit 40, an inverter PWM signal conversion unit 42, an inverter input voltage command operation unit 50, a converter duty ratio operation unit 52, and a converter PWM signal conversion unit 54.

Motor-control phase voltage operation unit 40 receives torque command value TR from the external ECU, receives output voltage VH of voltage step-up/step-down converter 12, that is, the input voltage for inverter 14, from voltage sensor 13, and receives motor current MCRT from current sensor 24. Then, based on these input signals, motor-control phase voltage operation unit 40 calculates manipulated variables (hereinafter also referred to as voltage commands) Vu*, Vv*, and Vw* of voltages (motor drive voltages) to be applied to the coil windings of respective phases of AC motor M1, and outputs calculated results to inverter PWM signal conversion unit 42.

Inverter PWM signal conversion unit 42 generates switching control signals S3 to S8 for actually turning on/off respective switching elements Q3 to Q8 in inverter 14 based on voltage commands Vu*, Vv* and Vw* for the coil windings of respective phases received from motor-control phase voltage operation unit 40 and outputs the switching control signals to inverter 14.

Each of switching elements Q3 to Q8 is thus subjected to switching control, and currents to be fed to the coil windings of respective phases of AC motor M1 are controlled such that AC motor M1 outputs commanded torque. A motor drive current is thus controlled and motor torque in accordance with torque command value TR is output.

Inverter input voltage command operation unit 50 operates an optimal value (a target value) of an inverter input voltage, that is, a voltage command Vdc_com, based on torque command value TR and motor speed MRN from the external ECU and outputs operated voltage command Vdc_com to converter duty ratio operation unit 52.

When converter duty ratio operation unit 52 receives voltage command Vdc_com from inverter input voltage command operation unit 50 and receives DC voltage Vb (hereinafter also referred to as a battery voltage Vb) from voltage sensor 10, converter duty ratio operation unit 52 operates a duty ratio for setting output voltage VH from voltage sensor 13 to voltage command Vdc_com. Then, converter duty ratio operation unit 52 outputs the operated duty ratio to converter PWM signal conversion unit 54.

Converter PWM signal conversion unit 54 generates switching control signals S1 and S2 for turning on/off respective switching elements Q1 and Q2 of voltage step-up/step-down converter 12 based on the duty ratio from converter duty ratio operation unit 52 and outputs the switching control signals to voltage step-up/step-down converter 12.

As electric power stored in reactor L1 increases with the increase in on-duty of switching element Q2 on the lower side of voltage step-up/step-down converter 12, output at higher voltage can be obtained. On the other hand, by increasing on-duty of switching element Q1 on the upper side, a voltage of the power supply line is lowered. Then, by controlling the duty ratio of switching elements Q1 and Q2, input voltage VH for inverter 14 can be controlled to any voltage up until an upper limit value set based on a withstand voltage or the like of the switching element, with the output voltage of power storage mechanism B being the lower limit.

By variably changing input voltage VH for inverter 14 in accordance with a state of operation of AC motor M1 through such control of voltage step-up/step-down converter 12, loss caused in electric motor drive device 100 (including motor loss, inverter loss and step-up converter loss) can be minimized and motor drive efficiency can be enhanced.

Inverter 14 converts input voltage VH converted to a high voltage equal to or higher than the output voltage from power storage mechanism B to an AC voltage (a motor drive voltage) through the switching operations of switching elements Q3 to Q8, to thereby drive AC motor M1.

Figure 3:
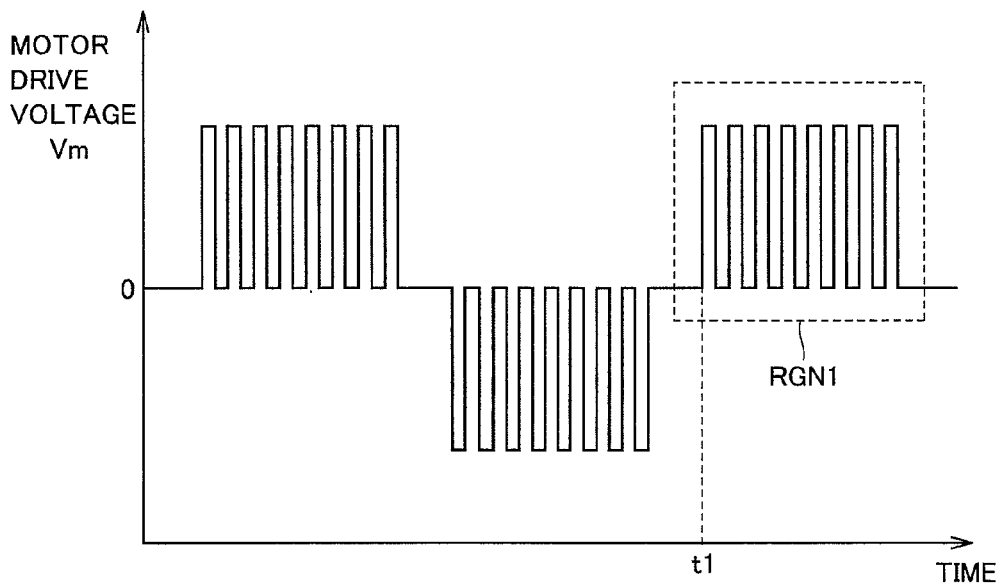
FIG. 3 is an output waveform diagram of an AC voltage (a motor drive voltage) Vm generated through switching operations of switching elements Q3 to Q8.

FIG. 3 is an output waveform diagram of AC voltage (motor drive voltage) Vm generated through switching operations of switching elements Q3 to Q8.

Referring to FIG. 3, motor drive voltage Vm is a bipolar pulse voltage of which polarity is reversed every half cycle. The pulse voltage having the same polarity in half cycle has a prescribed voltage amplitude and a prescribed pulse width. The prescribed voltage amplitude here is of magnitude in accordance with voltage commands Vu*, Vv* and Vw* of the coil windings of respective phases of AC motor M1 described above. The prescribed pulse width is in accordance with a carrier frequency of a carrier signal for generating switching control signals S3 to S8 for inverter 14.

When motor drive voltage Vm shown in FIG. 3 is applied to the coil windings of respective phases of AC motor M1, in the coil windings of respective phases, partial discharge may occur in a space (a gap) between the coil windings at the time of reversal of polarity of motor drive voltage Vm. Consequently, deterioration of an insulating material coating a lead of the coil winding proceeds, which finally results in short-circuit of insulation between phases and failure of equipment.

Figure 4:
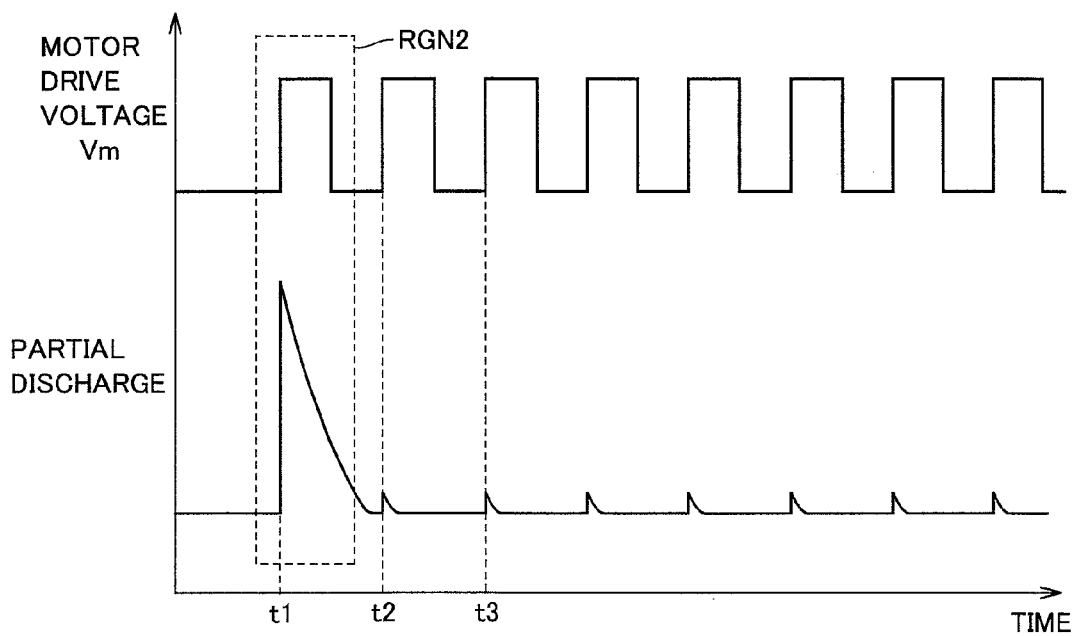
FIG. 4 is a diagram showing a measured waveform of partial discharge when motor drive voltage Vm in FIG. 3 is applied to a coil winding of each phase.

FIG. 4 is a diagram showing a measured waveform of partial discharge when motor drive voltage Vm in FIG. 3 is applied to a coil winding of each phase. It is noted that FIG. 4 shows an extracted waveform of partial discharge measured when motor drive voltage Vm exhibits a characteristic within a region RGN1 in FIG. 3.

Referring to FIG. 4, as described above, motor drive voltage Vm is composed of pulse voltages having the same polarity and each having a prescribed voltage amplitude and a pulse width in half cycle. Motor drive voltage Vm is set to a negative potential at time t1 or before, it crosses a zero potential, and thereafter it is set to a positive potential at time t1.

At time t1, which is timing when a first pulse voltage at the time of reversal of polarity of motor drive voltage Vm rises, partial discharge occurs in a gap between the coil windings. Partial discharge here is significantly greater than weak discharge that occurs after time t1 and at times t2, t3 and the like that are timing of rise of second and subsequent pulse voltages.

Thus, at the time of reversal of polarity of the motor drive voltage, partial discharge is relatively more likely to occur than before and after reversal of polarity. This is because, at the time of reversal of polarity of the motor drive voltage, generation of charges (surface charges) induced at the surface of the coil winding is likely and electric field generated by the surface charges in a gap between the coil windings is relatively strengthened.

In particular, when motor drive voltage Vm is a pulse voltage as in FIG. 4, the polarity of motor drive voltage Vm is reversed in a short period of time. Accordingly, while the surface charges induced at the surface of an insulating film of a lead of one coil winding set to a relatively positive potential before reversal of polarity remain without being diffused, surface charges start to be induced at the surface of an insulating film of a lead of the other coil winding newly set to the positive potential from the negative potential at the time of reversal. Electric field thus generated by the surface charges in a gap between the coil windings raises a gap voltage between the coil windings. Consequently, discharge (partial discharge) is more likely in a gap portion having a small width and establishing insulation. Namely, as the electric field generated by the surface charges in the gap is stronger, a voltage at which partial discharge starts is lowered. As deterioration of the insulating film thus proceeds, insulation between phases may finally be short-circuited and life until dielectric breakdown may be shorter.

Figure 5:
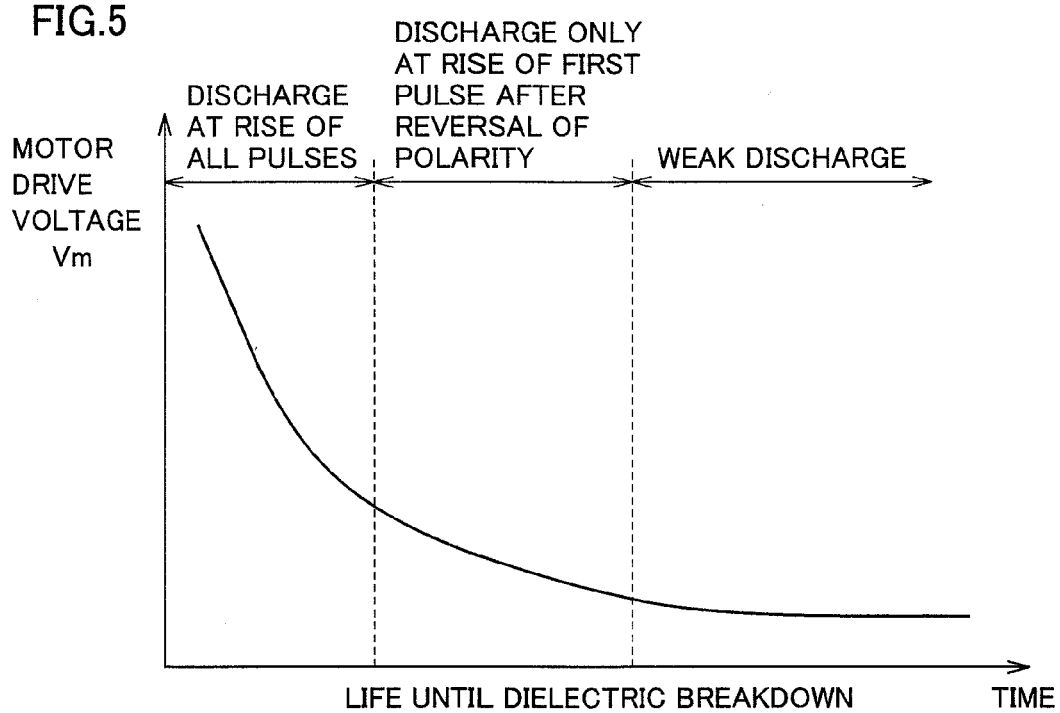
FIG. 5 is a diagram showing relation between motor drive voltage Vm and life until dielectric breakdown of the coil winding of each phase of an AC motor M1.

FIG. 5 is a diagram showing relation between motor drive voltage Vm and life until dielectric breakdown of the coil winding of each phase of AC motor M1.

Referring to FIG. 5, life until dielectric breakdown of the coil winding of each phase of AC motor M1 exhibits such tendency that it is longer as motor drive voltage Vm is lower. This is because partial discharge caused in the gap between the coil windings of respective phases is broadly categorized into three occurrence patterns, depending on magnitude of motor drive voltage Vm.

Specifically, when motor drive voltage Vm is relatively high, partial discharge occurs in the gap between the coil windings of respective phases not only at the time of reversal of polarity of motor drive voltage Vm but also at the time of rise of all pulse voltages having the same polarity. Consequently, life until dielectric breakdown of the coil windings of respective phases is relatively short.

In contrast, when motor drive voltage Vm is relatively low, only weak discharge occurs in the gap between the coil windings of respective phases, and consequently, life until dielectric breakdown of the coil windings of respective phases is relatively long.

When motor drive voltage Vm is intermediate between these two voltage levels, as described in connection with FIG. 4, partial discharge occurs in the gap between the coil windings of respective phases at the time of reversal of polarity of motor drive voltage Vm. During a normal operation of AC motor M1, such partial discharge at the time of reversal of polarity relatively often occurs.

Here, in order to make partial discharge in the gap less likely at the time of reversal of polarity of motor drive voltage Vm, a time period for surface charges induced at the surface of the insulating film of the coil winding to diffuse at the time of reversal of polarity of motor drive voltage Vm should be ensured. To that end, it is effective to gradually reverse the polarity of motor drive voltage Vm. Namely, by lowering a voltage variation rate of motor drive voltage Vm at the time of reversal of polarity, electric field generated by the surface charges in the gap can be weakened. Consequently, lowering in a voltage at which partial discharge is started can be prevented.

Accordingly, as measures for lowering such a voltage variation rate at the time of reversal of polarity of motor drive voltage Vm, the first embodiment is configured to control the switching operation of inverter 14 such that the time period for the first pulse voltage at the time of reversal of polarity (see a region RGN2 in FIG. 4) to rise is relatively longer than that of subsequent remaining pulse voltages.

Figure 6:
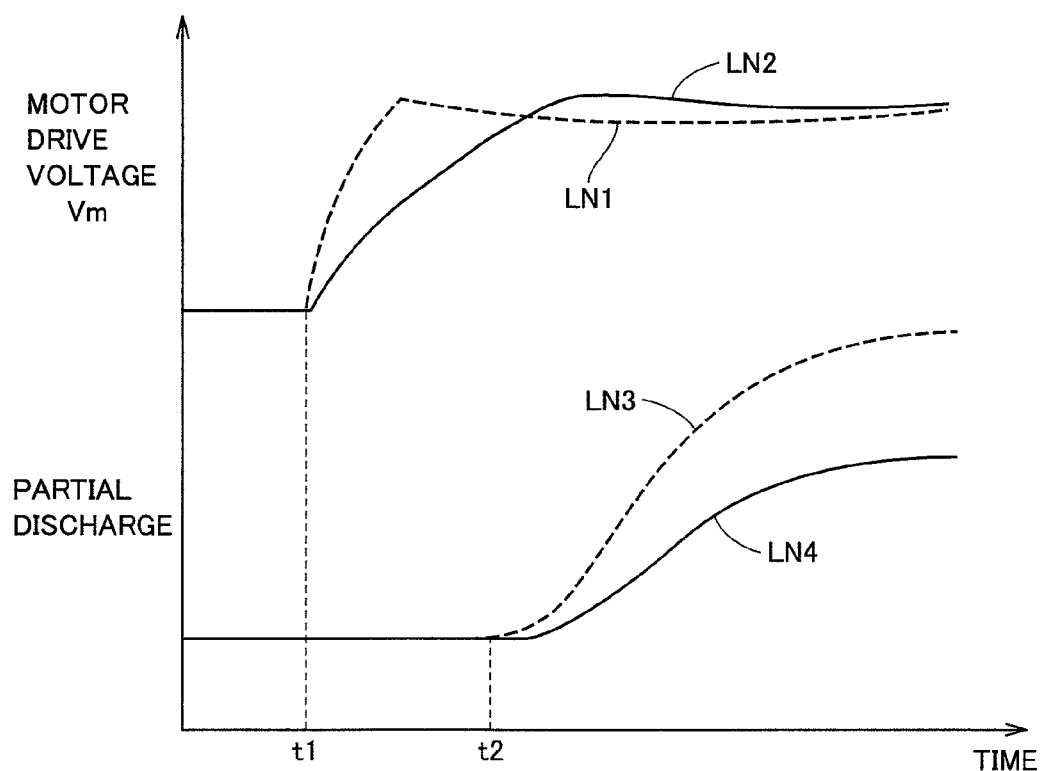
FIG. 6 is measured waveforms of a first pulse voltage at the time of reversal of polarity of motor drive voltage Vm and partial discharge when the pulse voltage is applied to the coil winding of each phase.

FIG. 6 is measured waveforms of the first pulse voltage at the time of reversal of polarity of motor drive voltage Vm and partial discharge that occurs when the pulse voltage is applied to the coil winding of each phase of AC motor M1.

In FIG. 6, lines LN1 and LN3 represent measured waveforms of the first pulse voltage at the time of reversal of polarity of motor drive voltage Vm generated under normal switching control and partial discharge, respectively. On the other hand, lines LN2 and LN4 in FIG. 6 represent measured waveforms of the first pulse voltage at the time of reversal of polarity generated under the control for lowering the voltage variation rate of motor drive voltage Vm at the time of reversal of polarity and partial discharge, respectively.

It can be seen from FIG. 6 that occurrence of partial discharge in the gap between the coil windings of respective phases is suppressed by making longer the time period for the first pulse voltage at the time of reversal of polarity to rise. Namely, such a situation that electric field generated by the surface charges remaining in the gap between the coil windings raises a gap voltage to make partial discharge more likely is avoided. Thus, occurrence of partial discharge can be suppressed and occurrence of inter-phase dielectric breakdown between the coil windings can be prevented.

Such a configuration that the time period for the first pulse voltage at the time of reversal of polarity to rise is made longer is actually implemented by configuring the drive circuit for generating gate voltages for turning on or off switching elements Q3 to Q8 in response to respective switching control signals S8 to S8 to be able to set a gate resistance variably among the first pulse voltage and remaining pulse voltages.

Figure 7:
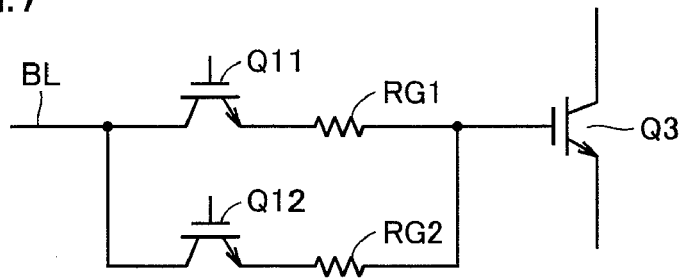
FIG. 7 is an electric circuit diagram showing an exemplary drive circuit making a time period for a pulse voltage to rise variable.

FIG. 7 is an electric circuit diagram showing an exemplary drive circuit making a time period for a pulse voltage to rise variable.

Referring to FIG. 7, the drive circuit includes resistors RG1 and RG2, switching elements Q11 and Q12, and a current supply line BL. Resistors RG1 and RG2 have one ends connected to the base of the switching element (for example, Q3) of inverter 14 and the other ends connected to respective emitters of switching elements Q11 and Q12. Switching elements Q11 and Q12 have collectors connected to current supply line BL and respective emitters connected to resistors RG1 and RG2, and they receive a switching control signal from control device 30 at their bases.

Regarding resistors RG1 and RG2, resistor RG1 is higher in a resistance value than resistor RG2. Therefore, by selecting resistor RG1 having a relatively higher resistance value at the time of reversal of polarity of motor drive voltage Vm, a voltage between the collector and the emitter of each of switching elements Q3 to Q8 at the time of turn-on and turn-off exhibits a relatively gentle waveform. Consequently, the time period for rise at the time of reversal of polarity of motor drive voltage Vm can be made relatively longer.

By selecting resistor RG2 having a relatively low resistance value for second and subsequent pulse voltages after reversal of polarity of motor drive voltage Vm, a voltage between the collector and the emitter of each of switching elements Q3 to Q8 at the time of turn-on and turn-off exhibits a relatively steep waveform. By setting resistor RG2 to a resistance value optimal for reducing loss caused at the time of turn-on and turn-off in each of switching elements Q3 to Q8, a pulse voltage of which rise waveform is steep as shown in FIG. 4 is generated. Consequently, loss caused at the time of turn-on and turn-off in each of switching elements Q3 to Q8 can be maintained low.

Figure 8:
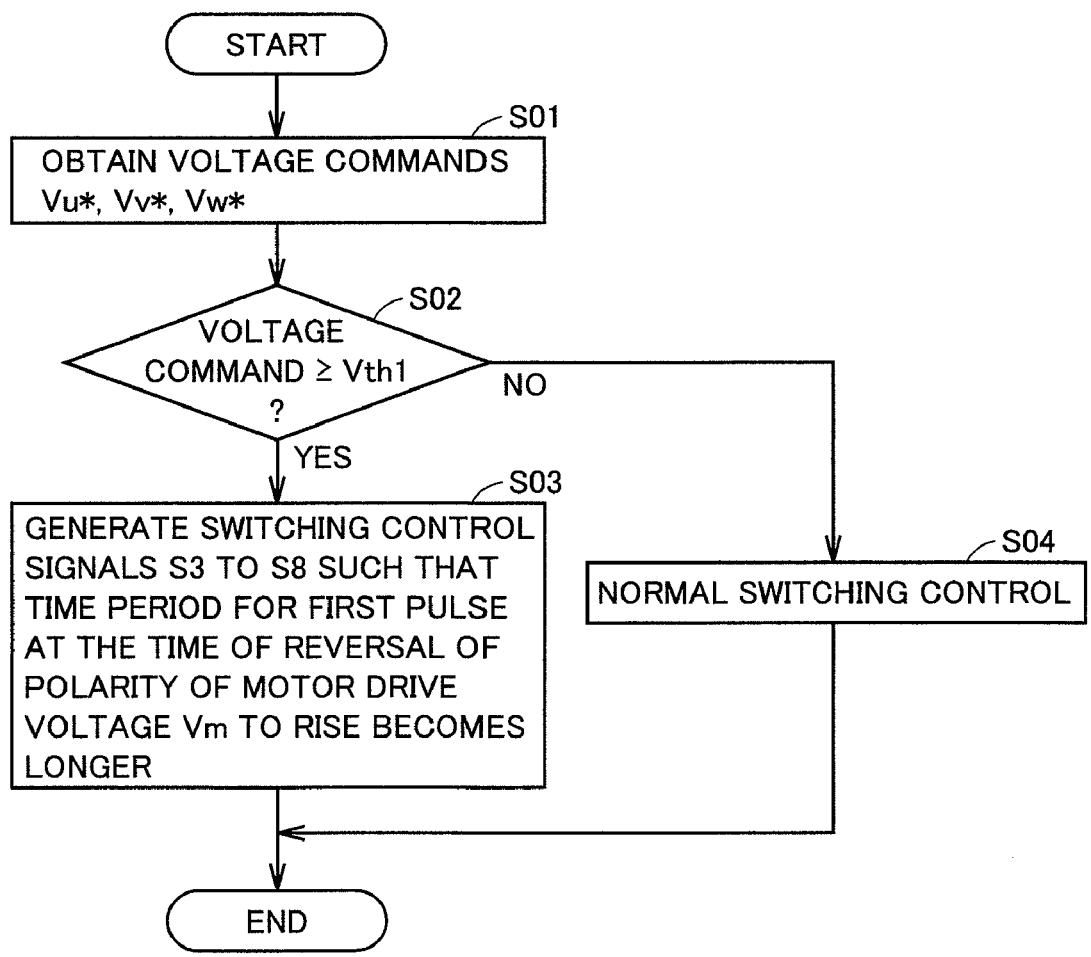
FIG. 8 is a flowchart for illustrating processing for switching control of an inverter in the electric motor drive device according to the first embodiment of the present invention.

FIG. 8 is a flowchart for illustrating processing for switching control of inverter 14 in electric motor drive device 100 according to the first embodiment of the present invention. The control processing in accordance with the flowchart shown in FIG. 8 is implemented by execution of a program stored in advance every prescribed cycle by control device 30.

Referring to FIG. 8, when control device 30 functioning as inverter PWM signal conversion unit 42 obtains voltage commands Vu*, Vv* and Vw* for the coil windings of respective phases from control device 30 functioning as motor-control phase voltage operation unit 40 (step S01), it determines whether or not these voltage commands Vu*, Vv* and Vw* are equal to or higher than a prescribed threshold value Vth1 set in advance (step S02). It is noted that prescribed threshold value Vth1 is set to be higher than motor drive voltage Vm at the time when weak discharge occurs in the gap between the coil windings of respective phases, based on relation between motor drive voltage Vm and life until dielectric breakdown of the coil winding of each phase of AC motor M1 shown in FIG. 5.

When voltage commands Vu*, Vv* and Vw* are lower than prescribed threshold value Vth1 (NO in step S02), control device 30 functioning as inverter PWM signal conversion unit 42 subjects switching elements Q3 to Q8 constituting inverter 14 to normal switching control, so as to generate switching control signals S3 to S8 for actually turning on/off respective switching elements Q3 to Q8 of inverter 14 (step S04). Here, resistor RG2 is selected in the drive circuit shown in FIG. 7.

In contrast, when voltage commands Vu*, Vv* and Vw* are equal to or higher than prescribed threshold value Vth1 (YES in step S02), control device 30 functioning as inverter PWM signal conversion unit 42 generates switching control signals S3 to S8 such that the time period for the first pulse voltage at the time of reversal of polarity of motor drive voltage Vm to rise is relatively long (step S03). Specifically, control device 30 uses the drive circuit shown in FIG. 7 to set a gate resistance variably among the first pulse voltage at the time of reversal of polarity of motor drive voltage Vm and remaining pulse voltages. Consequently, by preventing partial discharge from occurring, occurrence of inter-phase dielectric breakdown between the coil windings can be prevented.

The first embodiment is configured such that a gate resistance in the switching operation of inverter 14 is set variably among the first pulse voltage at the time of reversal of polarity and the remaining pulse voltages. It is apparent, however, that delay impedance in the path for transmitting switching control signals S3 to S8 from control device 30 to the gates (the control electrodes) of respective switching elements Q3 to Q8 should only be set variably among the first pulse voltage at the time of reversal of polarity and the remaining pulse voltages, without limited to the gate resistance. Namely, such a configuration as variably setting an added capacitance value or inductance value instead of a resistance component (a gate resistance) in the transmission path can also achieve a similar effect.

In addition, in the first embodiment, delay impedance represented by the gate resistance is variably set in two stages, for the first pulse voltage at the time of reversal of polarity and for the remaining pulse voltages. Regarding the first pulse voltage at the time of reversal of polarity, however, delay impedance may variably be set in a larger number of stages, that is, in three or more stages. Alternatively, a configuration may be such that delay impedance is continuously variably set, so as to gradually extend delay impedance with the increase in motor drive voltage Vm. By doing so, occurrence of partial discharge can effectively be prevented while suppressing loss caused in each of switching elements Q3 to Q8.

[Variation]

Figure 9:
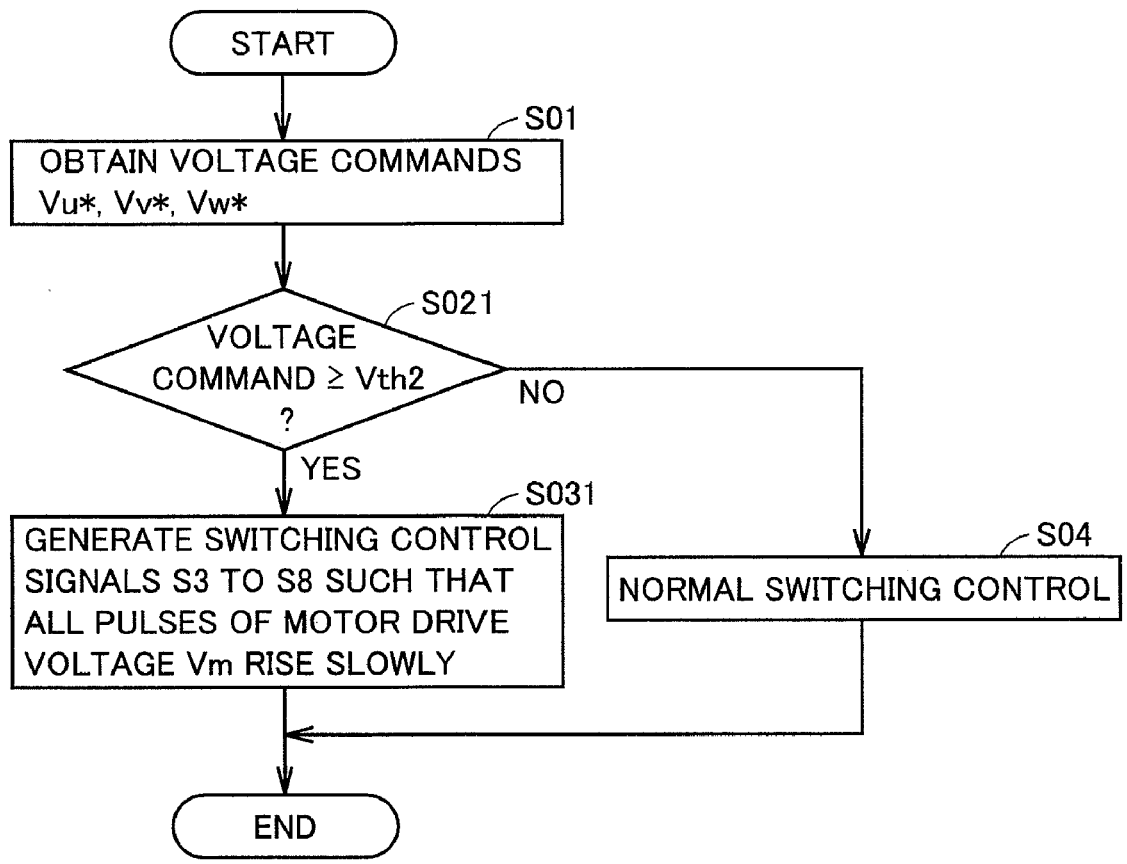
FIG. 9 is a flowchart for illustrating processing for switching control of an inverter 14 in the electric motor drive device according to a variation of the first embodiment of the present invention.

FIG. 9 is a flowchart for illustrating processing for switching control of inverter 14 in the electric motor drive device according to a variation of the first embodiment of the present invention. The control processing in accordance with the flowchart shown in FIG. 9 is implemented by execution of a program stored in advance every prescribed cycle by control device 30.

Referring to FIG. 9, when control device 30 functioning as inverter PWM signal conversion unit 42 obtains voltage commands Vu*, Vv* and Vw* for the coil windings of respective phases from control device 30 functioning as motor-control phase voltage operation unit 40 (step S01), it determines whether or not these voltage commands Vu*, Vv* and Vw* are equal to or higher than a prescribed threshold value Vth2 set in advance (step S021). It is noted that prescribed threshold value Vth2 is set to include a lower limit value of motor drive voltage Vm at the time when partial discharge occurs at the time of rise of all pulse voltages having the same polarity, based on relation between motor drive voltage Vm and life until dielectric breakdown of the coil winding of each phase of AC motor M1 shown in FIG. 5.

When voltage commands Vu*, Vv* and Vw* are lower than prescribed threshold value Vth2 (NO in step S021), control device 30 functioning as inverter PWM signal conversion unit 42 subjects switching elements Q3 to Q8 constituting inverter 14 to normal switching control, so as to generate switching control signals S3 to S8 for actually turning on/off respective switching elements Q3 to Q8 of inverter 14 (step S04). Here, resistor RG2 is selected in the drive circuit shown in FIG. 7.

In contrast, when voltage commands Vu*, Vv* and Vw* are equal to or higher than prescribed threshold value Vth2 (YES in step S021), control device 30 functioning as inverter PWM signal conversion unit 42 generates switching control signals S3 to S8 such that the time period for all pulse voltages having the same polarity, of which motor drive voltage Vm is composed, to rise is relatively long (step S031). Specifically, control device 30 uses the drive circuit shown in FIG. 7 to set a gate resistance to a relatively high resistance value for all pulse voltages having the same polarity. Consequently, since occurrence of partial discharge can reliably be prevented even in such a situation that motor drive voltage Vm is relatively high and partial discharge is more likely, occurrence of interphase dielectric breakdown between the coil windings can be prevented.

In order to make relatively longer the time period for all pulse voltages having the same polarity to rise as in the present variation, in addition to the configuration for raising the gate resistance, a capacitance of smoothing capacitor C2 provided on the input side of inverter 14 and a resistance value of discharge resistor R1 may also be adjusted.

Second Embodiment

Figure 10:
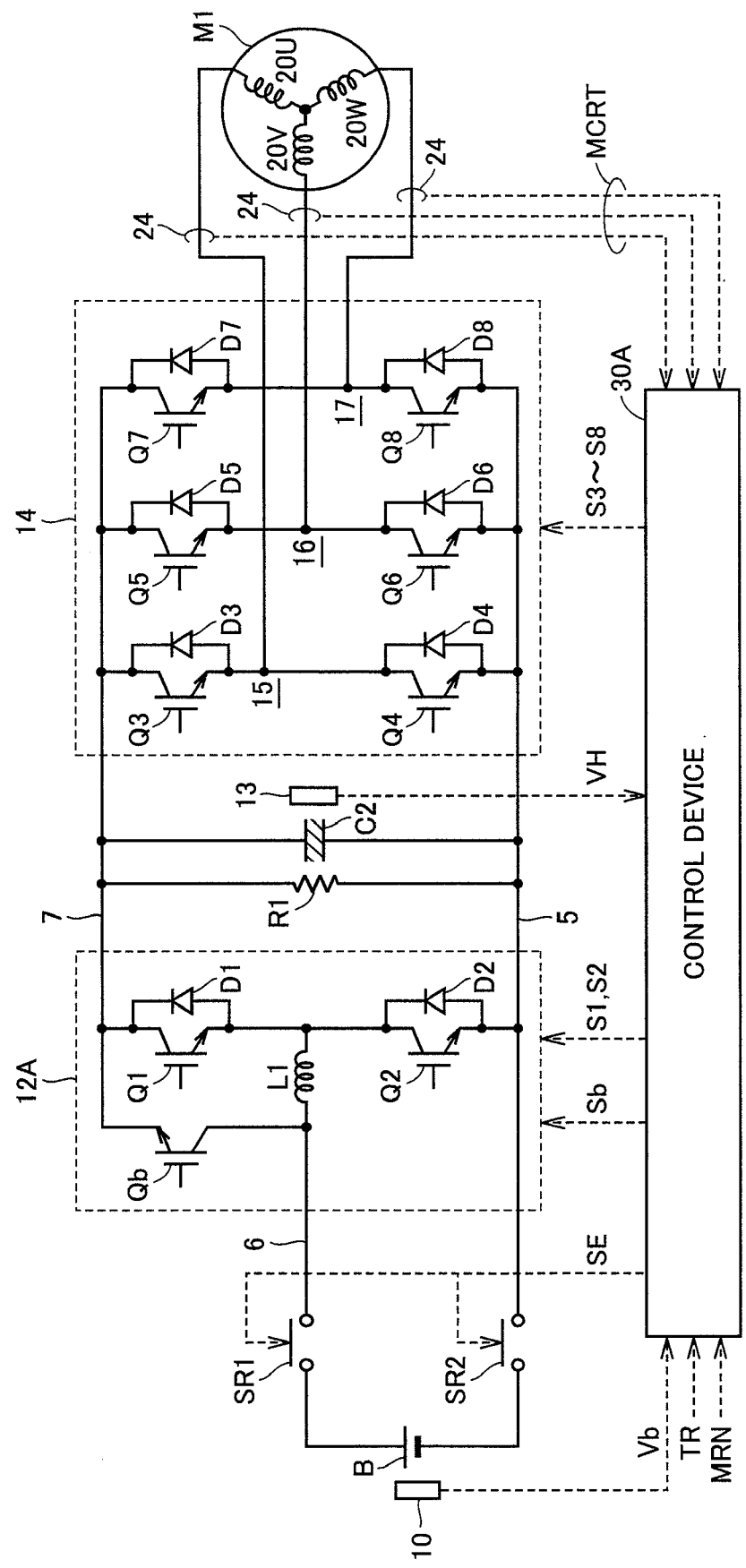
FIG. 10 is a schematic block diagram illustrating a configuration of an electric motor drive device according to a second embodiment of the present invention.

FIG. 10 is a schematic block diagram illustrating a configuration of an electric motor drive device 100A according to a second embodiment of the present invention.

Referring to FIG. 10, electric motor drive device 100A according to the second embodiment is different from electric motor drive device 100 shown in FIG. 1 in including a voltage step-up/step-down converter 12A instead of voltage step-up/ step-down converter 12. As electric motor drive device 100A is otherwise configured similarly to electric motor drive device 100 shown in FIG. 1, detailed description will not be repeated.

Voltage step-up/step-down converter 12A further includes a switching element Qb for directly connecting power supply line 6 and power supply line 7 to each other, without reactor L1 and switching element Q1 being interposed, as compared with voltage step-up/step-down converter 12 implemented by a step-up/step-down chopper circuit.

Switching element Qb is turned on or off by a switching control signal Sb from a control device 30A. When switching element Qb is turned on, a DC current from power storage mechanism B flows to power supply line 7 through switching element Qb. Accordingly, as a current is not supplied to reactor L1, a step-up operation is not performed so that input voltage VH for inverter 14 has a voltage level substantially as high as the output voltage from power storage mechanism B.

In contrast, when switching element Qb is turned off, input voltage VH for inverter 14 is controlled to any voltage, with the output voltage from power storage mechanism B being the lower limit, by controlling the duty ratio of switching elements Q1 and Q2.

It is noted that switching element Qb in the configuration in FIG. 10 corresponds to the "bypass switching element" in the present invention.

Figure 11:
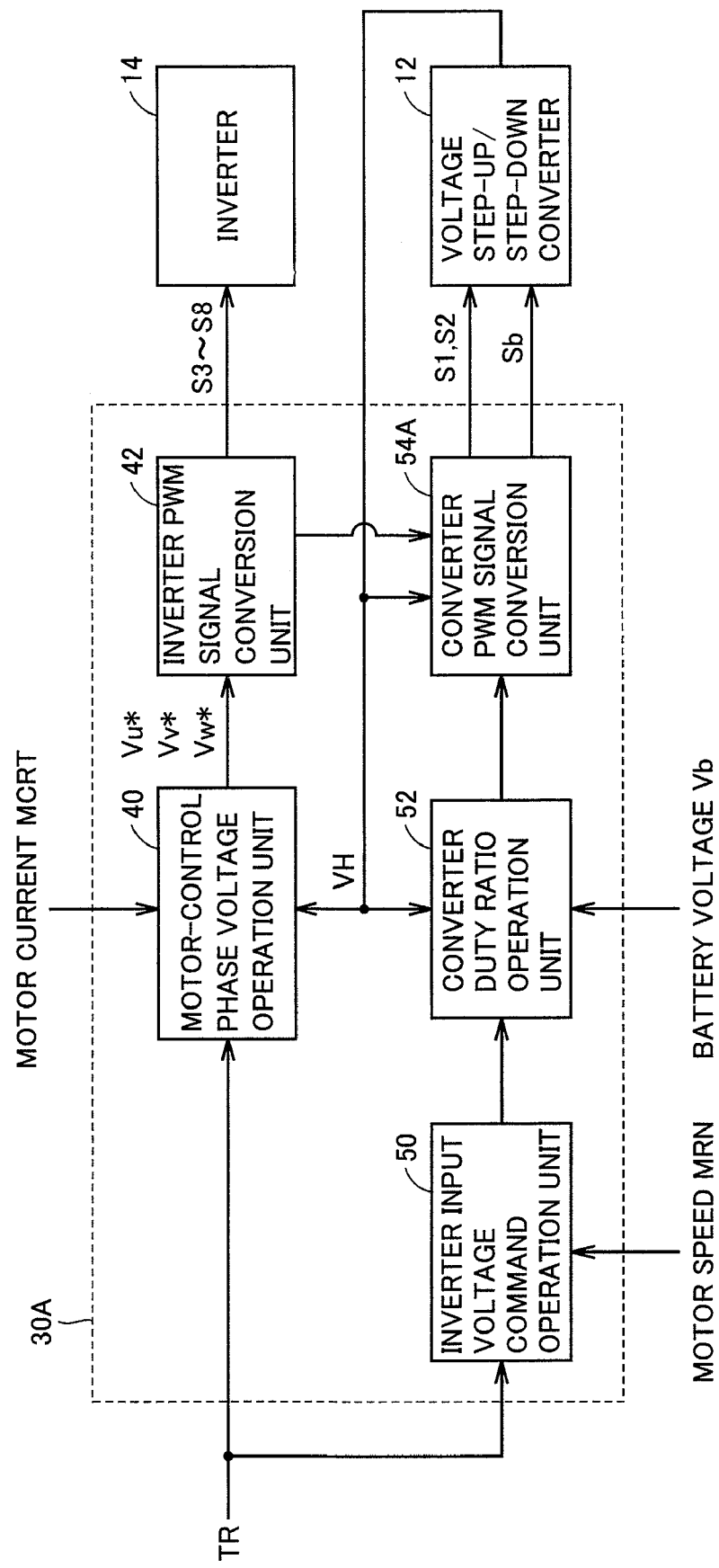
FIG. 11 is a block diagram of a control device in FIG. 10.

FIG. 11 is a block diagram of control device 30A in FIG. 10.

Referring to FIG. 11, control device 30A is different from control device 30 shown in FIG. 2 in including a converter PWM signal conversion unit 54A instead of converter PWM signal conversion unit 54. As control device 30A is otherwise configured similarly to control device 30 shown in FIG. 2, detailed description will not be repeated.

Converter PWM signal conversion unit 54A receives the duty ratio from converter duty ratio operation unit 52, receives input voltage VH for inverter 14 from voltage sensor 13, and receives voltage commands Vu*, Vv* and Vw* of the coil windings of respective phases from inverter PWM signal conversion unit 42. Then, converter PWM signal conversion unit 54A generates switching control signals S1 and S2 for turning on/off respective switching elements Q1 and Q2 of voltage step-up/step-down converter 12A based on the duty ratio and outputs the switching control signals to voltage step-up/step-down converter 12A.

In addition, converter PWM signal conversion unit 54A determines whether or not voltage commands Vu*, Vv* and Vw* are equal to or higher than prescribed threshold value Vth1. When voltage commands Vu*, Vv* and Vw* are equal to or higher than prescribed threshold value Vth1, converter PWM signal conversion unit 54A generates switching control signal Sb for turning on switching element Qb implementing the bypass switching element and outputs the switching control signal to switching element Qb. Thus, switching element Qb is turned on and input voltage VH for inverter 14 becomes substantially as high as the output voltage from power storage mechanism B.

Here, converter PWM signal conversion unit 54A senses timing of reversal of polarity of motor drive voltage Vm based on voltage commands Vu*, Vv* and Vw*, temporarily generates switching control signal Sb at the sensed timing, and outputs the switching control signal to switching element Qb. Thus, at the time of reversal of polarity of motor drive voltage Vm, a voltage substantially as high as the output voltage from power storage mechanism B is temporarily input to inverter 14.

Figure 12:
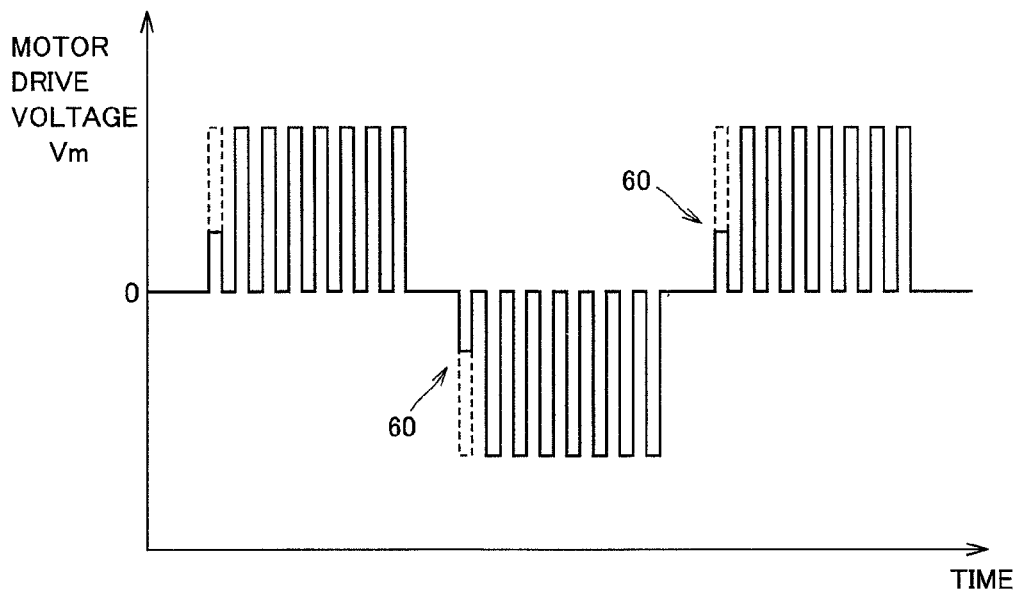
FIG. 12 is an output waveform diagram of AC voltage Vm generated through switching operations of switching elements Q3 to Q8 according to the second embodiment.

FIG. 12 is an output waveform diagram of AC voltage (motor drive voltage) Vm generated through switching operations of switching elements Q3 to Q8 according to the second embodiment.

Referring to FIG. 12, motor drive voltage Vm is a bipolar pulse voltage of which polarity is reversed every half cycle, as in the previous first embodiment. In the present second embodiment, under the switching control of switching element Qb described above, a voltage amplitude (see reference numeral 60 in FIG. 12) of the first pulse voltage at the time of reversal of polarity of motor drive voltage Vm is relatively smaller than a voltage amplitude of subsequent remaining pulse voltages, which is substantially equivalent to lowering in a voltage variation rate at the time of reversal of polarity of motor drive voltage Vm. Therefore, in the second embodiment as well, occurrence of partial discharge in the gap between the coil windings of respective phases is suppressed and occurrence of inter-phase dielectric breakdown between the coil windings can be prevented.

Figure 13:
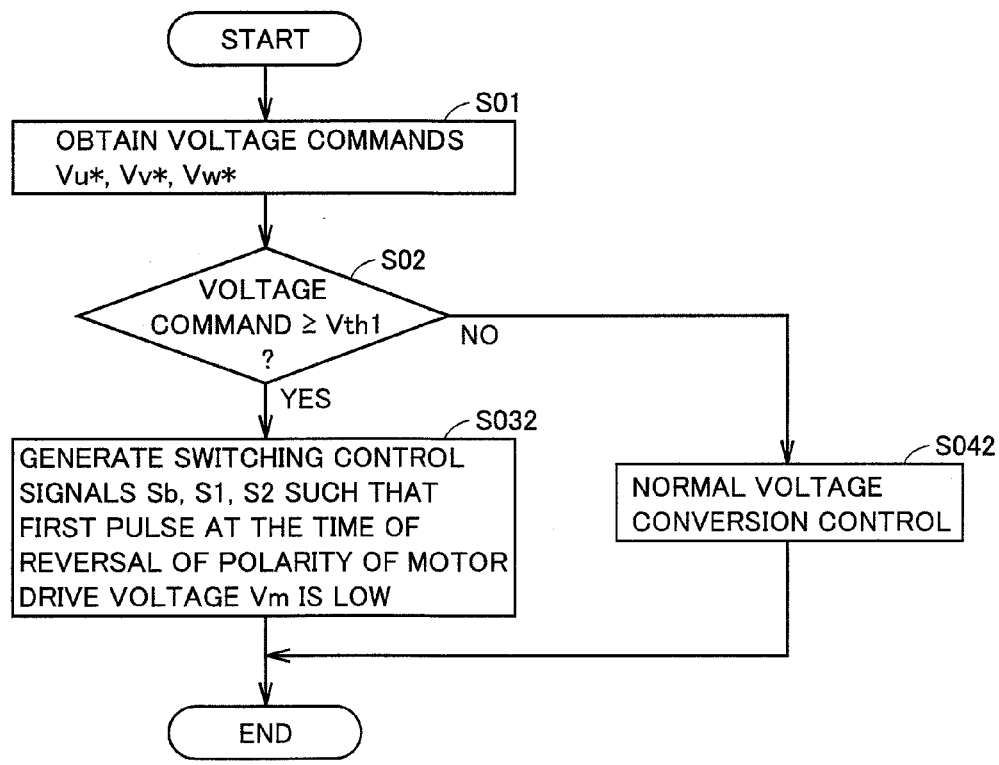
FIG. 13 is a flowchart for illustrating processing for switching control of an inverter in the electric motor drive device according to the second embodiment of the present invention.

FIG. 13 is a flowchart for illustrating processing for switching control of inverter 14 in electric motor drive device 100A according to the second embodiment of the present invention. The control processing in accordance with the flowchart shown in FIG. 13 is implemented by execution of a program stored in advance every prescribed cycle by control device 30A.

Referring to FIG. 13, when control device 30 functioning as converter PWM signal conversion unit 54A obtains voltage commands Vu*, Vv* and Vw* for the coil windings of respective phases from control device 30A functioning as inverter PWM signal conversion unit 42 (step S01), it determines whether or not these voltage commands Vu*, Vv* and Vw* are equal to or higher than prescribed threshold value Vth1 set in advance (step S02). As in the first embodiment, prescribed threshold value Vth1 is set to be higher than motor drive voltage Vm at the time when weak discharge occurs in the gap between the coil windings of respective phases, based on relation between motor drive voltage Vm and life until dielectric breakdown of the coil winding of each phase of AC motor M1 shown in FIG. 5.

When voltage commands Vu*, Vv* and Vw* are lower than prescribed threshold value Vth1 (NO in step S02), control device 30A functioning as converter PWM signal conversion unit 54A subjects switching elements Q1 and Q2 constituting voltage step-up/step-down converter 12 to normal voltage conversion control, so as to generate switching control signals S1 and S2 for turning on/off respective switching elements Q1 and Q2 (step S042). Here, switching element Qb is maintained in an OFF state in electric motor drive device 100A shown in FIG. 10.

In contrast, when voltage commands Vu*, Vv* and Vw* are equal to or higher than prescribed threshold value Vth1 (YES in step S02), control device 30A functioning as converter PWM signal conversion unit 54A generates switching control signals S1, S2 and Sb such that a voltage amplitude of the first pulse voltage at the time of reversal of polarity of motor drive voltage Vm is relatively small (step S032). Specifically, control device 30A turns on/off switching element Qb to set a voltage amplitude variably among the first pulse voltage at the time of reversal of polarity of motor drive voltage Vm and remaining pulse voltages. Consequently, by preventing partial discharge from occurring, occurrence of inter-phase dielectric breakdown between the coil windings can be prevented.

Third Embodiment

Figure 14:
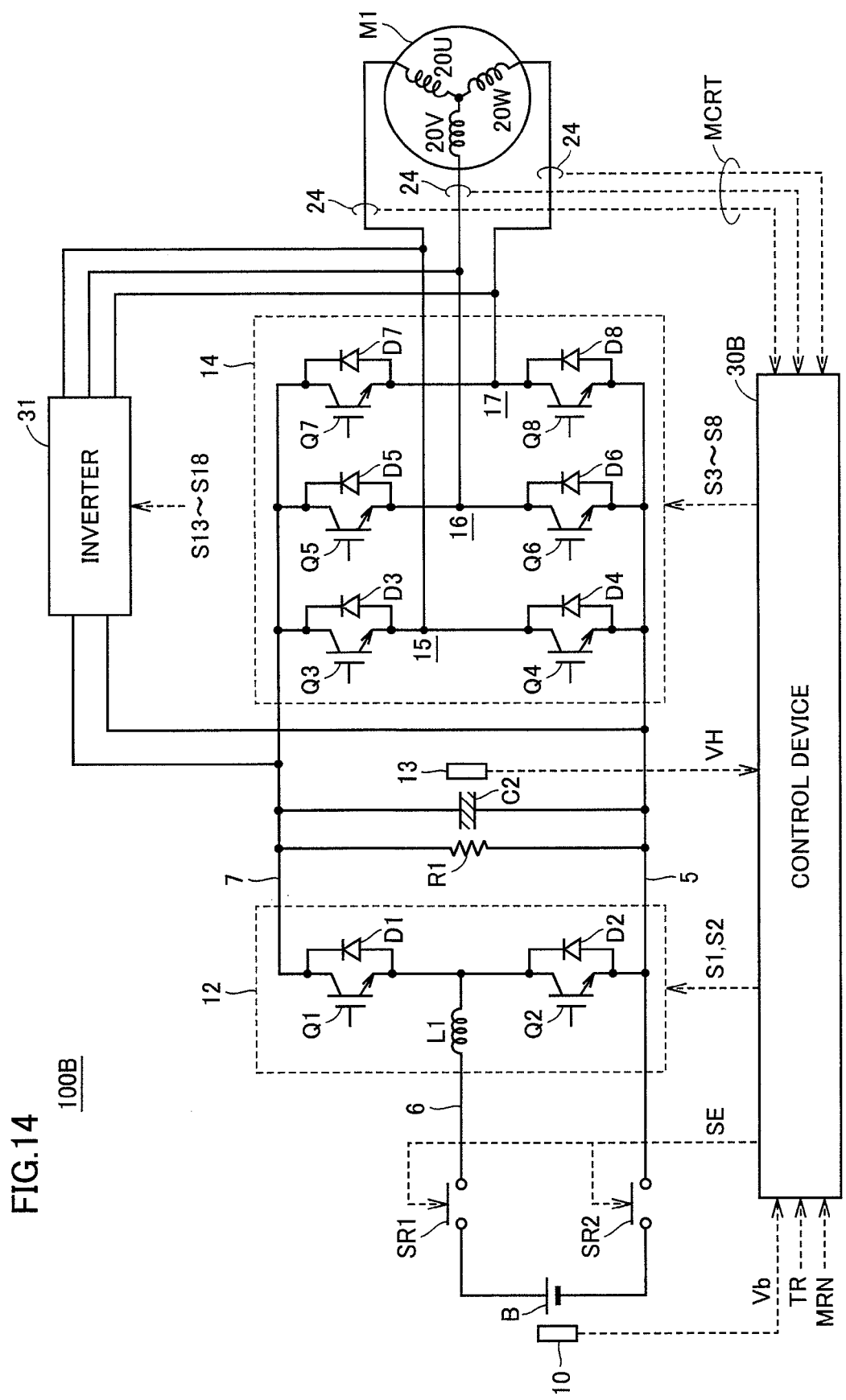
FIG. 14 is a schematic block diagram illustrating a configuration of an electric motor drive device according to a third embodiment of the present invention.

FIG. 14 is a schematic block diagram illustrating a configuration of an electric motor drive device 100B according to a third embodiment of the present invention.

Referring to FIG. 14, electric motor drive device 100B according to the third embodiment is different from electric motor drive device 100 shown in FIG. 1 in further including an inverter 31 connected to AC motor M1 in parallel to inverter 14. As electric motor drive device 100B is otherwise configured similarly to electric motor drive device 100 shown in FIG. 1, detailed description will not be repeated.

Though not shown, inverter 31 is configured similarly to inverter 14. Namely, inverter 31 is constituted of a U-phase arm, a V-phase arm and a W-phase arm provided in parallel between power supply line 7 and ground line 5. The arm of each phase is constituted of switching elements connected in series. Intermediate points of the arms of respective phases are connected to ends of respective phases of coil windings 20U, 20V and 20W of respective phases of AC motor M1.

When DC voltage VH is supplied from smoothing capacitor C2, inverter 31 generates a pulse voltage from DC voltage VH through switching operations of switching elements Q3 to Q8 (not shown) in response to respective switching control signals S13 to S18 from control device 30B. Then, the generated pulse voltage is applied to the coil winding of each phase of AC motor M1.

Thus, not only motor drive voltage Vm supplied from inverter 14 but also the pulse voltage from inverter 31 are applied to the coil windings of respective phases of AC motor M1.

Figure 15:
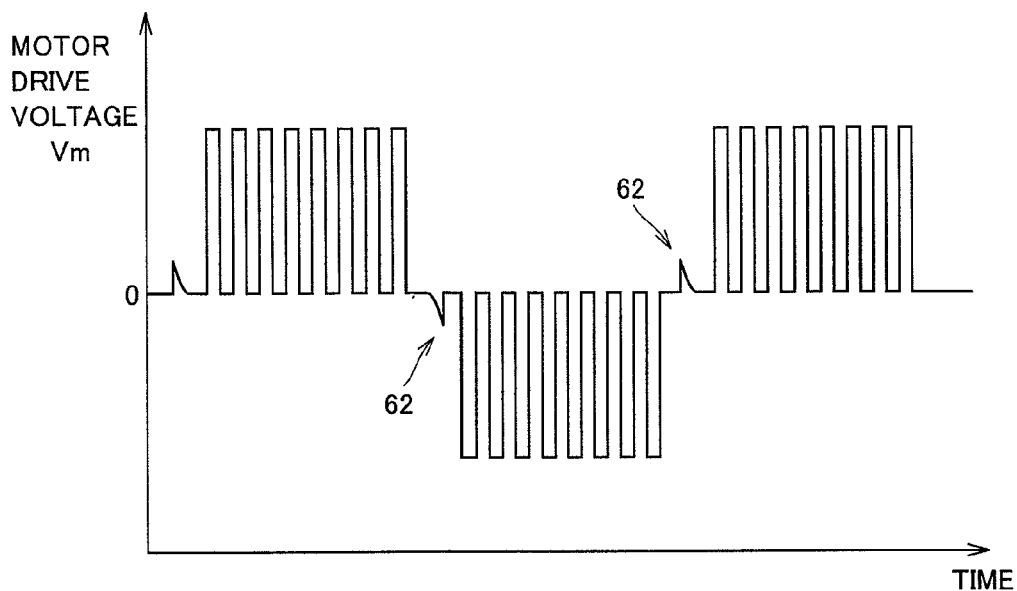
FIG. 15 is an output waveform diagram of a voltage applied to a coil winding of each phase of an AC motor through a switching operation of an inverter according to the third embodiment.

FIG. 15 is an output waveform diagram of a voltage applied to a coil winding of each phase of AC motor M1 through a switching operation of inverter 14, 31 according to the third embodiment.

Referring to FIG. 15, motor drive voltage Vm from inverter 14 is applied to the coil winding of each phase. As in the previous first embodiment, motor drive voltage Vm is a bipolar pulse voltage of which polarity is reversed every half cycle. In the present third embodiment, during a period in which motor drive voltage Vm crosses a zero potential at the time when its polarity is reversed, the pulse voltage (see reference numeral 62 in FIG. 15) is further applied from inverter 31.

Namely, the switching operation of inverter 31 is controlled such that inverter 31 generates a pulse voltage every half cycle of motor drive voltage Vm. An amplitude of this pulse voltage is set to a value smaller than that of pulse voltages of which motor drive voltage Vm is composed.

Then, by superimposing motor drive voltage Vm and the pulse voltage on each other, an AC voltage to be applied to the coil windings of respective phases generally exhibits such a waveform that rise of a voltage at the time of reversal of polarity is gentle. Consequently, as the voltage variation rate at the time of reversal of polarity of motor drive voltage Vm can be lowered, in the third embodiment as well, occurrence of partial discharge in the gap between the coil windings of respective phases can be suppressed and occurrence of inter-phase dielectric breakdown between the coil windings can be prevented.

Figure 16:
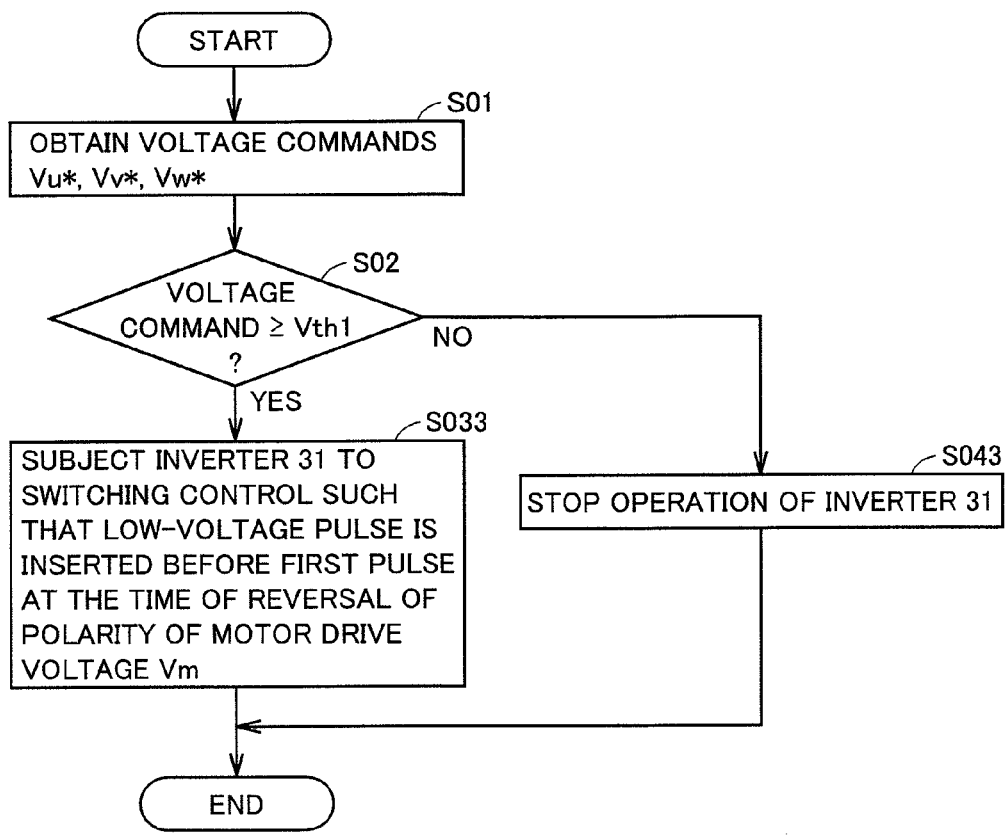
FIG. 16 is a flowchart for illustrating processing for switching control of inverters 14 and 31 in the electric motor drive device according to the third embodiment of the present invention.

FIG. 16 is a flowchart for illustrating processing for switching control of inverter 31 in electric motor drive device 100B according to the third embodiment of the present invention. The control processing in accordance with the flowchart shown in FIG. 16 is implemented by execution of a program stored in advance every prescribed cycle by control device 30B.

Referring to FIG. 16, when control device 30B functioning as inverter PWM signal conversion unit 42 obtains voltage commands Vu*, Vv* and Vw* for the coil windings of respective phases from control device 30B functioning as motor-control phase voltage operation unit 40 (step S01), it determines whether or not these voltage commands Vu*, Vv* and Vw* are equal to or higher than prescribed threshold value Vth1 set in advance (step S02). As in the first embodiment, prescribed threshold value Vth1 is set to be higher than motor drive voltage Vm at the time when weak discharge occurs in the gap between the coil windings of respective phases, based on relation between motor drive voltage Vm and life until dielectric breakdown of the coil winding of each phase of AC motor M1 shown in FIG. 5.

When voltage commands Vu*, Vv* and Vw* are lower than prescribed threshold value Vth1 (NO in step S02), control device 30B functioning as inverter PWM signal conversion unit 42 stops the operation of inverter 31 (step S043). Specifically, inverter PWM signal conversion unit 42 generates switching control signals S13 to S18 such that each of switching elements Q3 to Q8 constituting inverter 31 stops its switching operation (all turned off).

In contrast, when voltage commands Vu*, Vv* and Vw* are equal to or higher than prescribed threshold value Vth1 (YES in step S02), control device 30B functioning as inverter PWM signal conversion unit 42 generates switching control signals S13 to S18 such that inverter 31 generates a pulse voltage during a period in which motor drive voltage Vm crosses a zero potential at the time when its polarity is reversed and outputs the switching control signals to inverter 31 (step S033).

In parallel to the processing in steps S033 and S043, control device 30B functioning as inverter PWM signal conversion unit 42 generates switching control signals S3 to S8 for actually turning on/off respective switching elements Q3 to Q8 of inverter 14, based on voltage commands Vu*, Vv* and Vw*.

Thus, an AC voltage obtained by combining motor drive voltage Vm and the pulse voltage is applied to the coil winding of each phase of AC motor M1. This AC voltage is lower in a voltage variation rate at the time of reversal of polarity than motor drive voltage Vm. Therefore, occurrence of partial discharge in the gap between the coil windings can be suppressed. Consequently, prevention of occurrence of partial discharge can prevent occurrence of inter-phase dielectric breakdown between the coil windings.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is applicable to a power supply device mounted on a hybrid vehicle.

The invention claimed is:

1. An electric motor drive device, comprising:
an electric power conversion device for generating an AC voltage through a switching operation of a power semiconductor device;
an electric motor having a coil winding to which the AC voltage from said electric power conversion device is applied; and
a control device for controlling the switching operation of said electric power conversion device, and
said control device
setting a lower limit value of the AC voltage when partial discharge may occur in a space between said coil windings in reversal of polarity of said AC voltage to a first prescribed value, in accordance with relation between said AC voltage and life until dielectric breakdown of said coil winding of said electric motor, and
controlling the switching operation of said electric power conversion device such that a voltage variation rate in reversal of polarity of said AC voltage is relatively lower, when said AC voltage exceeds said first prescribed value, than when said AC voltage is lower than said first prescribed value.

2. The electric motor drive device according to claim 1, wherein
said electric power conversion device includes an inverter for generating, as said AC voltage, a bipolar pulse of voltage having a prescribed voltage amplitude and a prescribed pulse width through the switching operation of said power semiconductor device, and
said control device controls a switching operation of said inverter such that a time period for a first pulse voltage in reversal of polarity of said bipolar pulse of voltage to rise is relatively longer, when said prescribed voltage amplitude is equal to or greater than said first prescribed value, than a time period for subsequent remaining pulse voltages identical in polarity to rise.

3. The electric motor drive device according to claim 2, wherein
said inverter includes a path for transmitting a drive control signal to a control electrode of each said power semiconductor device, and
said control device sets a delay impedance of said path to be relatively higher for the first pulse voltage in reversal of polarity of said bipolar pulse of voltage, when said prescribed voltage amplitude is equal to or greater than said first prescribed value, than that for the subsequent remaining pulse voltages identical in polarity.

4. The electric motor drive device according to claim 1, wherein
said electric power conversion device includes an inverter for generating, as said AC voltage, a bipolar pulse of voltage having a prescribed voltage amplitude and a prescribed pulse width through the switching operation of said power semiconductor device, and
said control device sets a lower limit value of the AC voltage when partial discharge may occur at rise of all pulse voltages identical in polarity to a second prescribed value in accordance with relation between said AC voltage and life until dielectric breakdown of said coil winding of said electric motor, and controls a switching operation of said inverter such that a time period for the all pulse voltages of said bipolar pulse of voltage to rise is relatively longer, when said prescribed voltage amplitude is equal to or greater than said second prescribed value, than when said prescribed voltage amplitude is smaller than said second prescribed value.

5. The electric motor drive device according to claim 4, wherein
said inverter includes a path for transmitting a drive control signal to a control electrode of each said power semiconductor device, and
said control device sets a delay impedance of said path to be relatively higher, when said prescribed voltage amplitude is equal to or greater than said second prescribed value, than when said prescribed voltage amplitude is smaller than said second prescribed value.

6. The electric motor drive device according to claim 1, wherein
said electric power conversion device includes
an inverter for generating, as said AC voltage, a bipolar pulse of voltage having a prescribed voltage amplitude and a prescribed pulse width through the switching operation of said power semiconductor device, and
a DC power supply configured to be able to variably control an input voltage for said inverter through the switching operation of said power semiconductor device, and
said control device controls a switching operation of said DC power supply such that said input voltage in reversal of polarity of said AC voltage is relatively lower, when said AC voltage is equal to or higher than said first prescribed value, than when said AC voltage is lower than said first prescribed value.

7. The electric motor drive device according to claim 6, wherein
said DC power supply includes
a converter for converting a DC voltage from a power storage mechanism through the switching operation of said power semiconductor device, and
a bypass switching element for forming a current path for bypassing said converter, between said power storage mechanism and said inverter, and
said control device turns on said bypass switching element in reversal of polarity of said AC voltage when said AC voltage is equal to or higher than said first prescribed value.

8. The electric motor drive device according to claim 1, wherein
said electric power conversion device further includes
an inverter for generating, as said AC voltage, a bipolar pulse of voltage having a prescribed voltage amplitude and a prescribed pulse width through the switching operation of said power semiconductor device, and
a pulse generator connected to said coil winding in parallel to said inverter and configured to be able to apply a pulse to said coil winding through the switching operation of said power semiconductor device, and
said control device controls, in a case where said AC voltage is equal to or higher than said first prescribed value, said pulse generator such that a pulse relatively smaller in voltage amplitude than said AC voltage is applied to said coil winding when said AC voltage is at zero potential in reversal of polarity of said AC voltage.

9. A method of controlling an electric motor drive device including an electric power conversion device for generating an AC voltage through a switching operation of a power semiconductor device and an electric motor having a coil winding to which the AC voltage from said electric power conversion device is applied, comprising the steps of:
obtaining said AC voltage;
setting a lower limit value of the AC voltage when partial discharge may occur in a space between said coil windings in reversal of polarity of said AC voltage to a first prescribed value in accordance with relation between said AC voltage and life until dielectric breakdown of said coil winding of said electric motor; and
controlling the switching operation of said electric power conversion device such that a voltage variation rate in reversal of polarity of said AC voltage is relatively lower, when said AC voltage is equal to or higher than said first prescribed value, than when said AC voltage is lower than said first prescribed value.

10. The method of controlling an electric motor drive device according to claim 9, wherein
said electric power conversion device includes an inverter for generating, as said AC voltage, a bipolar pulse of voltage having a prescribed voltage amplitude and a prescribed pulse width through the switching operation of said power semiconductor device, and
in said step of controlling the switching operation of said electric power conversion device, when said prescribed voltage amplitude is equal to or greater than said first prescribed value, a switching operation of said inverter is controlled such that a time period for a first pulse voltage in reversal of polarity of said bipolar pulse of voltage to rise is relatively longer than a time period for subsequent remaining pulse voltages identical in polarity to rise.

11. The method of controlling an electric motor drive device according to claim 10, wherein
said inverter includes a path for transmitting a drive control signal to a control electrode of each said power semiconductor device, and
in controlling the switching operation of said inverter, when said prescribed voltage amplitude is equal to or greater than said first prescribed value, a delay impedance of said path is set to be relatively higher for the first pulse voltage in reversal of polarity of said bipolar pulse of voltage than that for the subsequent remaining pulse voltages identical in polarity.

12. The method of controlling an electric motor drive device according to claim 9, wherein
said electric power conversion device includes an inverter for generating, as said AC voltage, a bipolar pulse of voltage having a prescribed voltage amplitude and a prescribed pulse width through the switching operation of said power semiconductor device, and
in said step of controlling the switching operation of said electric power conversion device,
a lower limit value of the AC voltage when partial discharge may occur at rise of all pulse voltages identical in polarity is set to a second prescribed value in accordance with relation between said AC voltage and life until dielectric breakdown of said coil winding of said electric motor, and
when said prescribed voltage amplitude is equal to or greater than said second prescribed value, a switching operation of said inverter is controlled such that a time period for all pulse voltages of said bipolar pulse voltage to rise is relatively longer than when said prescribed voltage amplitude is smaller than said second prescribed value.

13. The method of controlling an electric motor drive device according to claim 12, wherein
said inverter includes a path for transmitting a drive control signal to a control electrode of each said power semiconductor device, and
in controlling the switching operation of said inverter, when said prescribed voltage amplitude is equal to or greater than said second prescribed value, a delay impedance of said path is set to be relatively higher than when said prescribed voltage amplitude is smaller than said second prescribed value.

14. The method of controlling an electric motor drive device according to claim 9, wherein
said electric power conversion device includes
an inverter for generating, as said AC voltage, a bipolar pulse of voltage having a prescribed voltage amplitude and a prescribed pulse width through the switching operation of said power semiconductor device, and a DC power supply configured to be able to variably control an input voltage for said inverter through the switching operation of said power semiconductor device, and in said step of controlling the switching operation of said electric power conversion device, when said AC voltage is equal to or higher than said first prescribed value, a switching operation of said DC power supply is controlled such that said input voltage in reversal of polarity of said AC voltage is relatively lower than when said AC voltage is lower than said first prescribed value.

15. The method of controlling an electric motor drive device according to claim 14, wherein said DC power supply includes a converter for converting a DC voltage from a power storage mechanism through the switching operation of said power semiconductor device, and a bypass switching element for forming a current path for bypassing said converter, between said power storage mechanism and said inverter, and in controlling the switching operation of said DC power supply, when said AC voltage is equal to or higher than said first prescribed value, said bypass switching element is turned on in reversal of polarity of said AC voltage.

16. The method of controlling an electric motor drive device according to claim 9, wherein said electric power conversion device further includes an inverter for generating, as said AC voltage, a bipolar pulse of voltage having a prescribed voltage amplitude and a prescribed pulse width through the switching operation of said power semiconductor device, and a pulse generator connected to said coil winding in parallel to said inverter and configured to be able to apply a pulse to said coil winding through the switching operation of said power semiconductor device, and in said step of controlling the switching operation of said electric power conversion device, in a case where said AC voltage is equal to or higher than said first prescribed value, said pulse generator is controlled such that a pulse relatively smaller in voltage amplitude than said AC voltage is applied to said coil winding when said AC voltage is at zero potential in reversal of polarity of said AC voltage.

* * * * *